J. KRITCH.

Assignor to THE CLEVELAND AXLE MANUFACTURING CO.

Machine for Boring Wagon-Hubs.

No. 8,442. Reissued Oct. 1, 1878.

Witnesses.
E. R. Taylor
J. J. Philbrick.

Inventor.
Jacob Kritch
per Burridge & Co.
attys.

N. PETERS, PHOTO-LITHOGRAPHER, WASHINGTON, D. C.

UNITED STATES PATENT OFFICE.

JACOB KRITCH, OF CLEVELAND, OHIO, ASSIGNOR, BY MESNE ASSIGNMENTS, TO THE CLEVELAND AXLE MANUFACTURING COMPANY, FORMERLY KNOWN AS THE KRITCH & CRANE MANUFACTURING COMPANY.

IMPROVEMENT IN MACHINES FOR BORING WAGON-HUBS.

Specification forming part of Letters Patent No. 44,807, dated October 25, 1864; Reissue No. 8,442, dated October 1, 1878; application filed August 14, 1878.

*To all whom it may concern:*

Be it known that I, JACOB KRITCH, of Cleveland, in the county of Cuyahoga and State of Ohio, have invented new and useful Improvements in Machines for Boring Carriage-Wheel Hubs; and I do hereby declare that the following is a full and exact description thereof, reference being had to the accompanying drawings, making a part of this specification, in which—

Figure 1:
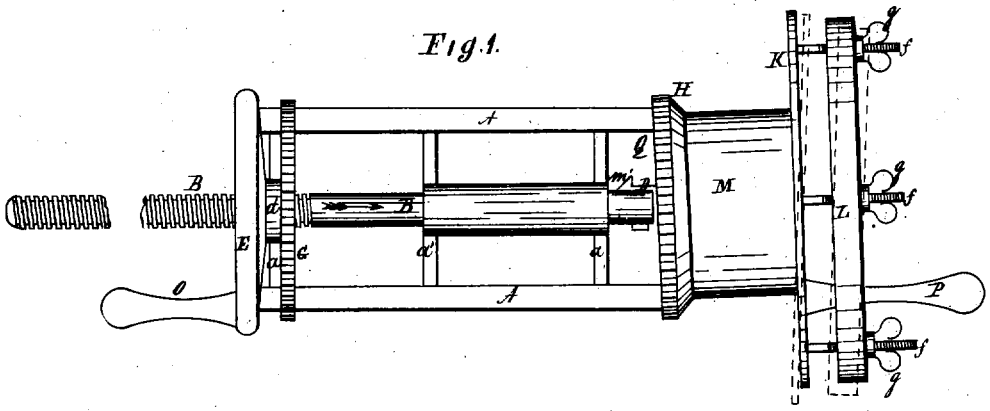
Figure 2:
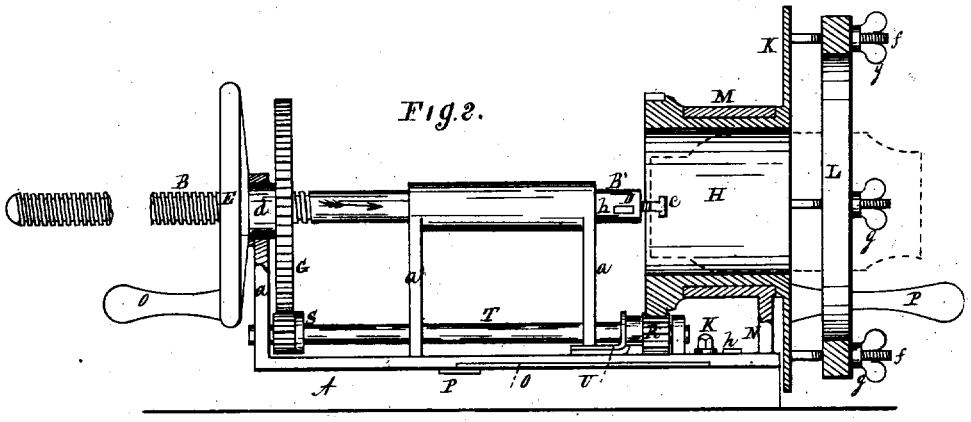
Figure 5:
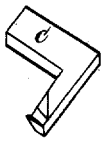
Figure 6:
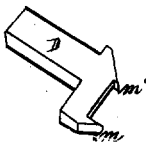
Figure 4:
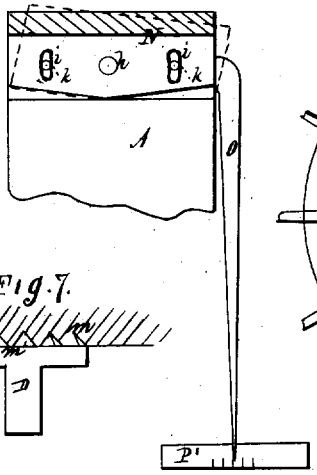
Figure 7:
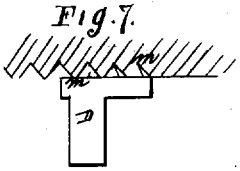
Figure 3:
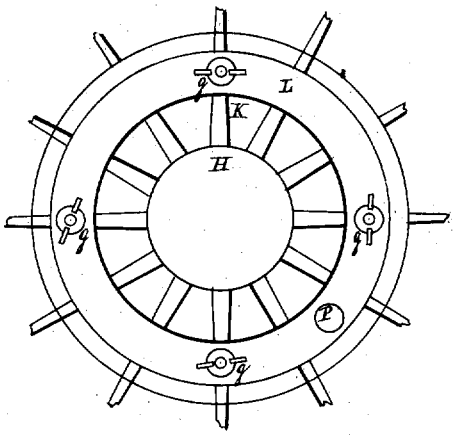

Figure 1 is a plan of my improved machine. Fig. 2 is a side elevation, with the pivoted head that sustains the hub while being bored. (Shown in section.) Fig. 3 is a view showing the method of attaching and securing the wheel to the face-plate. Fig. 4 is a plan of a portion of the bottom of the machine, showing more particularly the adjustable bed that supports the hub-head, and the index for indicating the adjustment. Figs. 5 and 6 are perspective views of the cutters for boring and threading the hub; Fig. 7, a diagram, showing the threading-cutter in the act of forming the screw-thread.

Like letters of reference indicate corresponding parts in all the figures.

My invention consists in the combination of a revolving hollow head or socket that holds the hub or wheel while being bored with a reciprocating non-revolving cutter that feeds gradually forward. Said head or socket is arranged on a pivot or center in such a manner as to be adjusted to any degree adapted to the boring or forming the tapering hole in the hub for the reception of the box; also, in the employment of a tool, in connection with a non-revolving bar or shaft, for cutting a screw-thread on the inside of the hub for the box to screw into.

I obtained a patent dated September 9, 1862, in which a screw-thread is cut on the inside of the hub for the reception of the box.

My machine, herein shown, is especially adapted to boring ordinary hubs requiring a smooth, tapering, or straight hole, and may be employed for forming a screw-thread on the inside, a tool being used for this particular purpose.

As represented in the drawings, a frame, A, is provided, having standards *a a′ a′*, which sustain a cutter-bar or screw-shaft, B, in the head-rest B′. To the head of the shaft is screwed a cutter, *c* or *d*, as occasion may require. A convenient means of securing the cutter in place is by passing the cutter into the socket *b*, in the head of the shaft, and by means of a set-screw, *e*, pressed against it.

The screw-shaft is kept from turning by any suitable means, and is fed forward by a turning nut, *d*, sustained and turning in a bearing in the rear standard, *a*, on one side of which is the wheel E, and on the other a gear-wheel, G, the use of which will presently be explained.

In the front of the machine is situated a hollow head or socket, H, which may be cylindrical or conical in form and of sufficient size to receive the end of the hub. This head is provided with a face-plate, K, at its outer end, of sufficient size for the wheel to rest against, and from the face of this plate project four or more screw-bolts, *f f*, which support a ring or holder, L, and outside this ring nuts *g g* turn on the screw-bolts, so that the ring may be adjusted forward or backward, as desired.

The balance-wheel E is provided with a winch, O, and the face-plate K with a winch, P, for feeding forward and withdrawing the cutter or bar. The head or socket H rests and turns in a bearing, M, supported by a bed-plate, N, Figs. 2 and 4. This bed-plate is pivoted at *h*, so that it may be turned horizontally in either direction, and is provided with a concentric slot or slots, *i*, through which passes a tightening screw or screws, *k*, by which means the said bed-plate can be securely held in any desirable angular position for the purpose required.

For the purpose of allowing an easy adjustment, the edges of the bed-plate that come in contact with the main bed may be made angular or beveled, as shown at *t*, Fig. 4. To the bed-plate, on one side, is secured an index-hand, O, the pointer of which moves over a scale, P′, by which the angular adjustment to produce the taper of the hole in the hub may be indicated. The inner end of the head or socket H is provided with a cog-wheel, Q, into which gears a pinion, R, on the end of a shaft, T. On this shaft is secured the pinion S, gearing into the cog-wheel G. Said shaft is journaled at its ends in suitable bearings. Thus when the cog-wheel G is turned, the head H also receives motion, and also the hub, which it holds. The pinion R is made to move in and out of gear with the cog-wheel Q by means of the sliding clutch R, operated by the clutch-lever U. This is for the purpose of enabling the screw to be fed back without revolving the head H after the hub has been bored.

The cutter C is similar in construction to others used for the same or similar purposes. The cutter D, however, is peculiar in its formation and action. It is provided at a suitable distance apart with cutting-points *m* and *m'*, set at such an inward angle as will correspond with the desired bevel or inclination of the sides of the screw-thread to be cut on the inside of the hub. As the cutter is gradually fed along, and as the hub revolves, the forward point, *m*, cuts one side or bevel of the screw-thread, while the rear point, *m'*, following up and being set at the opposite angle, cuts the opposite side or bevel of the screw-thread, as clearly represented in the diagram, Fig. 7. The screw-thread is thus cut in the simplest manner and with the greatest accuracy.

The operation of the machine is as follows: The wheel is placed between the ring L and the face-plate K, with the hub extending into the socket H, as shown. In this position it is centered by turning or loosening the nuts *g g*, and then by tightening up these screws the wheel is secured for boring. When this is accomplished, by loosening the set-screws *k* the head H is turned upon the pivot *h* in an angular position (indicated by dotted lines in Fig. 1) until the index O indicates the amount of adjustment necessary to produce the required taper of the hole to be bored in the hub. In this position the screws *k* are tightened and the head H firmly secured. This angular position of the head brings the axis of the inner end of the hub (or that next the cutter) at a greater distance from the axis of the cutter-shaft B than the outer end; consequently at first the cutter strikes deeper, but gradually cuts shallower and shallower as it approaches the outer end, in this manner forming a true and regular taper. The head H being thus adjusted, the nut *d* is turned, and the cutter fed forward, while at the same time, through the medium of gearing G, S, R, and Q, the revoling motion is imparted to the head and hub.

The means employed to produce the taper of the hole in the hub is of a simple and most effective character, for it is only necessary to set the head H at the desired angle.

What I claim as my invention, and desire to secure by Letters Patent, is—

1. The combination of the adjustable revolving hub head or socket H, capable of being set at any angle laterally, and the non-revolving feeding cutter-shaft B, the whole arranged substantially as herein described.

2. The arrangement of the adjustable revolving hub head or socket H, disk K, ring L, and centering-screws and nuts *f g*, for centering and sustaining the hub while being bored, substantially as herein set forth.

3. The threading-cutters D, provided with the angular cutting-points *m m'*, for producing the threads on the inside of the hub, substantially as herein described.

4. In a hub-boring machine, the combination of a bed-frame carrying the boring apparatus, the non-revolving bar supplied with the necessary cutting-tools, an adjustable rotary head, and spur and pinion gear for reciprocating the feed-screw, substantially as and for the purpose described.

JACOB KRITCH.

Witnesses:
J. H. BURRIDGE,
J. P. ABBOTT.